(12) United States Patent
Morgan

(10) Patent No.: US 9,639,093 B2
(45) Date of Patent: May 2, 2017

(54) SELF-ALIGNING AXIALLY CONSTRAINED REGULATOR VALVE ASSEMBLY

(75) Inventor: Daniel P. Morgan, Vacaville, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1209 days.

(21) Appl. No.: 13/318,872

(22) PCT Filed: May 7, 2010

(86) PCT No.: PCT/US2010/033954
§ 371 (c)(1),
(2), (4) Date: Jan. 18, 2012

(87) PCT Pub. No.: WO2010/129826
PCT Pub. Date: Nov. 11, 2010

(65) Prior Publication Data
US 2012/0126160 A1   May 24, 2012

Related U.S. Application Data

(60) Provisional application No. 61/176,184, filed on May 7, 2009.

(51) Int. Cl.
*G05D 16/06*   (2006.01)

(52) U.S. Cl.
CPC ..... *G05D 16/0633* (2013.01); *G05D 16/0663* (2013.01); *G05D 16/068* (2013.01);
(Continued)

(58) Field of Classification Search
CPC ............. G05D 16/0641; G05D 16/065; G05D 16/0658; G05D 16/0666; G05D 16/068; F16K 7/16; F16K 99/0015; F16K 47/14
(Continued)

(56) References Cited

U.S. PATENT DOCUMENTS 1,865,991 A   7/1932   Winkler
3,307,819 A * 3/1967   Cocito ................... B65G 47/91
                                                        137/852

(Continued)

FOREIGN PATENT DOCUMENTS

GB    289 943    5/1928
GB    2 236 165  3/1991
(Continued)

OTHER PUBLICATIONS

International Search Report for corresponding application No. PCT/US2010/033954 dated Oct. 21, 2011.
(Continued)

*Primary Examiner* — William McCalister
(74) *Attorney, Agent, or Firm* — Renner, Otto, Boisselle and Sklar LLP

(57) ABSTRACT

A valve poppet (54) is provided for use in a regulator valve assembly (200) for regulating the pressure of a flowing gas through a gas flow pressure regulator (300). The valve poppet is includes a valve disc (54) having a flexible portion (60*a*) so as to permit upward and downward movement of a valve stem (52) in an axial direction. The valve disc may have an edge portion (60*b*) that provides a preloading force to self-align the valve disc within a valve seat (70), and axially constrain the motion of valve stem. The valve stem (52) may extend perpendicularly relative to the valve disc from a sealing portion (58). The movement of the valve stem is axially constrained and results in upward and downward movement of the flexible portion when the valve is opened and closed. The flexible and end portions of the valve disc may be formed of a plurality of spiral arms for self-aligning and axially constraining the valve disc.

16 Claims, 10 Drawing Sheets

(52) U.S. Cl.
CPC ..... *G05D 16/0641* (2013.01); *G05D 16/0658* (2013.01); *G05D 16/0661* (2013.01)

(58) Field of Classification Search
USPC .......... 137/505.42, 505.39, 505.38; 251/319, 251/320, 331, 61.1, 61.2
See application file for complete search history.

(56) References Cited

U.S. PATENT DOCUMENTS

| | | | | |
|---|---|---|---|---|
| 3,817,488 | A | * | 6/1974 | Mack ...................... F16K 31/06 137/625.64 |
| 3,921,670 | A | * | 11/1975 | Clippard, Jr. ....... F16K 31/0606 137/625.27 |
| 4,045,009 | A | * | 8/1977 | Pees ........................ B60R 19/32 137/512.15 |
| 4,141,379 | A | * | 2/1979 | Manske ................ A61M 39/24 137/496 |
| 4,196,751 | A | * | 4/1980 | Fischer ............... F16K 31/0606 137/625.65 |
| 4,541,429 | A | * | 9/1985 | Prosl ................. A61M 5/14276 251/129.21 |
| 4,574,835 | A | * | 3/1986 | Williams ................ F16K 15/10 137/512.15 |
| 4,635,683 | A | * | 1/1987 | Nielsen ..................... H01F 7/13 137/625.65 |
| 4,741,510 | A | * | 5/1988 | Baumann .................. F16K 7/16 251/120 |
| 4,796,854 | A | | 1/1989 | Ewing |
| 4,969,629 | A | * | 11/1990 | Athanassiu ............. F16K 31/06 251/129.17 |
| 4,981,421 | A | | 1/1991 | Baumann |
| 5,158,263 | A | * | 10/1992 | Shimizu ............. F16K 31/0655 251/129.17 |
| 5,163,468 | A | | 11/1992 | Robinson et al. ....... 137/315.05 |
| 5,202,658 | A | * | 4/1993 | Everett ................ H01F 7/1615 335/230 |
| 5,241,984 | A | | 9/1993 | Onjohji et al. |
| 5,390,697 | A | * | 2/1995 | Muschelknautz ......... F01N 3/22 137/494 |
| 5,474,100 | A | * | 12/1995 | Nishijima .......... G05D 16/2013 137/544 |
| 5,513,832 | A | * | 5/1996 | Becker ................ F16K 31/0624 137/82 |
| 5,727,594 | A | * | 3/1998 | Choksi .................. A61M 39/24 137/537 |
| 5,758,865 | A | * | 6/1998 | Casey ................ F02M 51/0639 251/129.17 |
| 5,950,652 | A | | 9/1999 | Morgan |
| 5,988,215 | A | * | 11/1999 | Martin .................... F23N 1/007 137/505.41 |
| 6,079,435 | A | * | 6/2000 | Franz ................. G05D 16/2013 137/82 |
| 6,084,493 | A | * | 7/2000 | Siegel ........................... 335/278 |
| 6,095,496 | A | | 8/2000 | Rydin et al. |
| 6,116,576 | A | | 9/2000 | Höglund et al. |
| 6,220,569 | B1 | * | 4/2001 | Kelly ...................... F16K 31/06 251/129.08 |
| 6,240,962 | B1 | * | 6/2001 | Tai ............................ F15C 5/00 137/852 |
| 6,443,183 | B1 | | 9/2002 | Roorda |
| 6,668,849 | B2 | * | 12/2003 | Onstenk ................ F04D 29/281 137/1 |
| 6,932,532 | B2 | * | 8/2005 | Schwartzman .... B65D 47/2062 215/311 |
| 6,983,924 | B2 | * | 1/2006 | Howell ................... F16F 1/027 251/118 |
| 7,287,546 | B2 | * | 10/2007 | Konishi ............. F02M 37/0029 123/511 |
| 7,654,283 | B2 | * | 2/2010 | Seto ........................ F04B 43/04 137/454.2 |
| 7,721,763 | B2 | * | 5/2010 | Choksi .................. F16K 15/144 137/515.5 |
| 8,100,382 | B2 | * | 1/2012 | Robertson, III ........ F16K 31/06 239/569 |
| 8,256,740 | B2 | * | 9/2012 | Nakakubo .................... 251/61.2 |
| 2009/0269650 | A1 | | 10/2009 | Nakakubo |

FOREIGN PATENT DOCUMENTS

| | | |
|---|---|---|
| JP | S58-155461 | 10/1983 |
| JP | S58-187819 | 12/1983 |
| JP | 2008-82240 | 4/2008 |
| JP | 2008-82543 | 4/2008 |
| JP | 2008-518146 | 5/2008 |
| WO | 2005/031201 | 4/2005 |
| WO | 2006/047530 | 5/2006 |
| WO | WO 2006/047530 A1 | 5/2006 |
| WO | WO 2008026753 A1 * | 3/2008 ............. F16L 37/38 |

OTHER PUBLICATIONS

Office Action for corresponding Japanese Application No. 2012-509992, dated Feb. 24, 2014 and English translation.

Notice of Preliminary Rejection for corresponding Korean Application No. 10-2011-7026334, dated Dec. 7, 2015 and English translation.

* cited by examiner

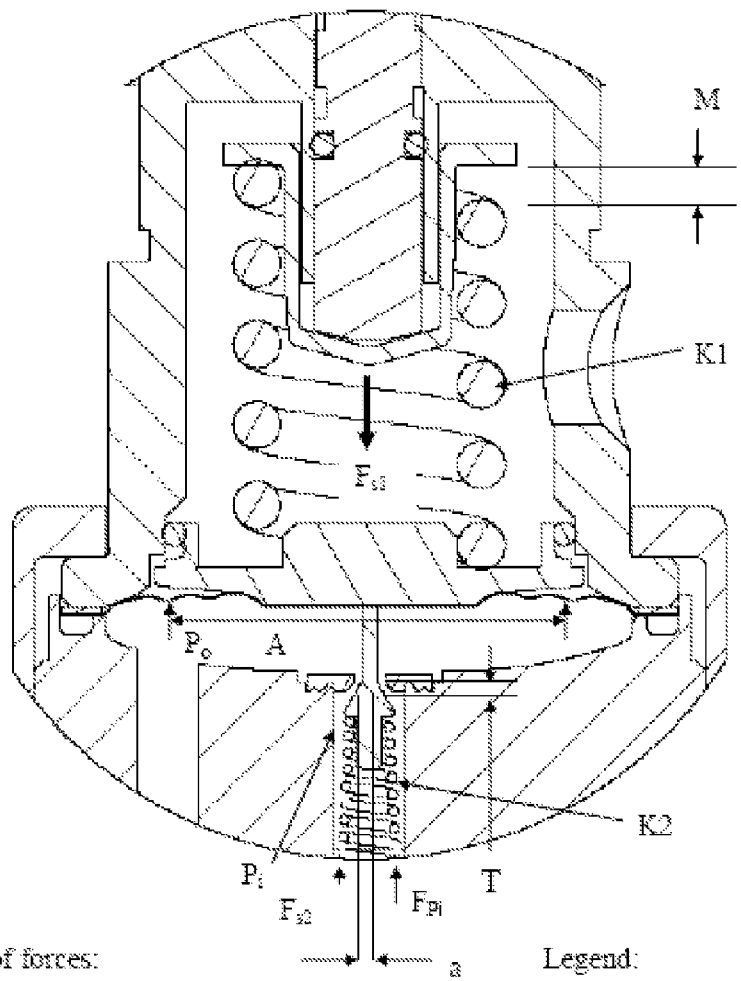

Summation of forces:

$F_{s1} = F_{s2} + F_{pi} + P_o \times A$

Which can be rearranged to:

$P_o = (F_{s1} - F_{s2} - F_{pi})/A$

Where:

$F_{s1} = K1 \times M$
$F_{s2} = K2 \times T$
$F_{Pi} = (P_i - P_o) \times a$

FIG. 2

Legend:

$F_{s1}$ = Range Spring Force
$K1$ = Range Spring Spring Rate
$F_{s2}$ = Valve Spring Force
$K2$ = Valve Spring Spring Rate
$M$ = Range Spring Deflection
$T$ = Valve Deflection
$P_i$ = Inlet Pressure
$P_o$ = Outlet Pressure
$A$ = Diaphragm Effective Area
$a$ = Valve Seat Area

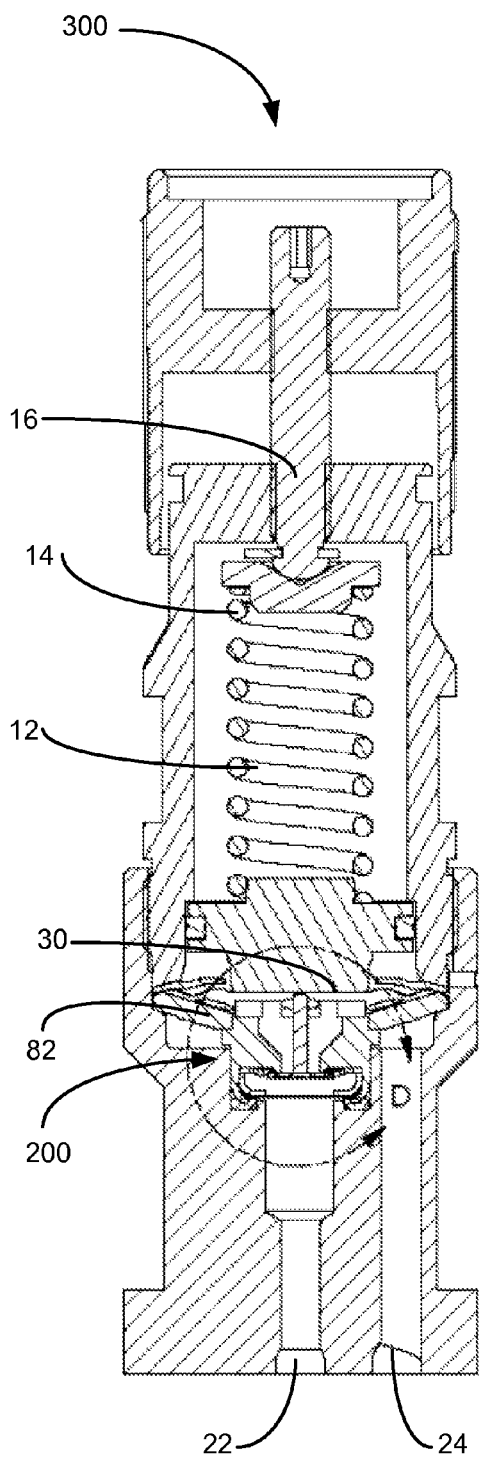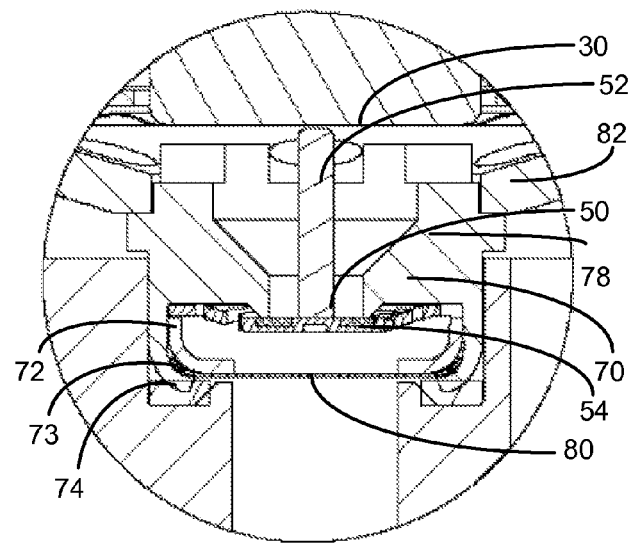
FIG. 9B
FIG. 9A

SELF-ALIGNING AXIALLY CONSTRAINED REGULATOR VALVE ASSEMBLY

RELATED APPLICATION

This application claims the benefit of U.S. Provisional Patent Application Ser. No. 61/176,184 filed May 7, 2009, which is hereby incorporated herein by reference.

FIELD OF THE INVENTION

The present invention is directed to gas flow pressure regulators, and more particularly to a self-aligning, axially constrained regulator valve poppet, and a related regulator valve assembly and regulator including the same. The invention has particular application to pressure regulators used in relatively low flow systems, such as, for example, regulators used in manufacturing semiconductor devices.

BACKGROUND OF THE INVENTION

A gas flow pressure regulator is a device that reduces a relatively high input pressure to an adjustable, relatively constant lower outlet pressure. FIG. 1 depicts a conventional pressure regulator 100. The pressure regulator 100 may include an upper or range assembly 10 and a lower assembly 20, and a diaphragm 30 positioned between the upper and lower assemblies. The range assembly 10 is fairly conventional and may include a range spring 12 and associated support and housing structures as are known in the art.

The lower assembly 20 includes an inlet 22, an outlet 24, and a valve assembly 40 for regulating the pressure of a gas flow from the inlet to the outlet. The valve assembly 40 may include a valve spring 42 for acting upon a valve 44. The valve 44 includes a valve poppet 46 contiguous with a valve stem 47 that presses against the diaphragm 30. The valve 44 is biased by the valve spring 42 against a valve seat 48 as part of controlling the gas flow. The lower assembly 20 may include additional associated support structures as are known in the art.

The pressure regulator operates as follows to control the pressure of a flowing gas from the inlet 22, through the valve assembly 40, to the outlet 24. The valve spring 42 loads the valve 44 against the valve seat 48 to stop the flow of gas. For example, in an exemplary regulator used in semiconductor manufacturing, the valve spring may load the valve 44 against the valve seat with approximately three pounds of force to achieve a leak-tight seal in the absence of a range spring load. An upper end 14 of the range spring 12 is compressed by means of a threaded stem 16 to create a downward load. This drives the diaphragm 30 down to drive the valve 40 away from the valve seat 48, which allows gas to flow into the chamber 49 below the diaphragm 30. The diaphragm 30 typically is a resilient member with a relatively planar surface that is in communication with the valve stem 47. The diaphragm acts to prevent gas from escaping to the atmosphere, while being flexible enough to transmit the load from the range spring 12 to the valve assembly 40. A knob 11 in the upper assembly 10 may be turned by a user to apply a force to the range spring 12. This force of the range spring is transmitted by the diaphragm 30 to the valve assembly 40 to move the valve 44 from the seat 48 to permit the flow of gas through the valve. When the pressure acting on the diaphragm area generates a force equal to the range spring force, the system is balanced and the device will maintain that pressure to provide a constant pressure gas flow to the outlet.

FIG. 2 depicts a closer view of the pressure regulator 100 in the portion containing the range spring 12, diaphragm 30, and valve assembly 40. The legend of FIG. 2 identifies the pressure and force relationships by which this conventional pressure regulator operates, as are understood by those skilled in the art. As a result of such relationships, a relatively high pressure input gas flow may be converted to a constant and lower output gas flow across the regulator valve.

The force balance relationships depicted in FIG. 2 result in basic performance characteristics that can be represented as a curve. An exemplary performance characteristics curve is shown in FIG. 3, which shows the outlet pressure as a function of flow. As can be understood from FIG. 3, as the flow increases, the valve must open further resulting in a lower range spring force pushing down on the diaphragm. The result in turn is lower outlet pressure.

As the flow approaches zero, i.e., the valve approaches closure, the curve of FIG. 3 shows a sharp increase in the upward slope. This sharp slope increase is indicative of the force required to seal the valve 44 against the valve seat 48. In a flowing condition, the forces on either side of the diaphragm 30 are balanced in a manner such that the valve is positioned spaced apart from the valve seat to permit gas flow through the valve. As gas flow is reduced toward termination of the flow (i.e., the valve is being closed), the outlet pressure will rise to reduce the downward load on the valve until there is sufficient force between the valve and the valve seat to create a seal. The increase in pressure that occurs to produce the seal between the valve and valve seat is referred to in the art as "creep".

Conventional pressure regulators as described above have deficiencies, which are depicted in FIGS. 4 and 5. As previously described, the force balance that ultimately determines the regulator outlet pressure is developed through the use of springs. The ideal regulator would have all components perfectly centered relative to one another, and all of the spring loads centered along the axis of the poppet travel. In actual performance, the components typically are not perfectly centered, and the force from the springs is not perfectly along the axis of poppet travel.

Conventional helical springs, such as those depicted in FIGS. 1 and 2, that are typically used in the construction of pressure regulators are fabricated with ground ends which lie in a plane that are from one to two degrees of perpendicular to the direction of poppet travel. In addition, the ends become even more non-perpendicular as the springs are compressed. The result of component misalignment and non-axial spring loads is a lateral load of the poppet against the seat. This non-axial, asymmetric spring load and the resultant lateral load are shown in FIG. 4. The lateral load of the valve against the valve seat increases the friction associated with the movement of the valve causing the valve to resist motion. The force for opening the valve, therefore, must initially overcome the increased frictional force before the valve can move.

By virtue of the increased frictional force, the valve tends to stick initially as the forces attempt to open the valve. When the opening force becomes sufficient to overcome the friction, the valve overshoots its ideal position, resulting in a temporary spike in the flow. The valve then recovers to its ideal position. This overshoot and recovery is shown on the chart of FIG. 5. The sudden change in pressure associated with the overshoot may undermine the performance of downstream components, particularly in relatively low flow systems. For example, downstream performance particularly may be undermined in mass flow controllers that are employed in the manufacture of semiconductor devices.

Valve seat wear is a second deficiency that arises from the misalignment of the components and forces in a conventional pressure regulator valve assembly. This also is of particular concern in valves having high valve stroke rates associated with their flow rates, which tends to cause far more seat wear than low stroke applications. The results of seat wear include an increase in the creep pressure and, eventually, leak across the seat. Degradation in performance due to high stroke cycling can be observed in as little as 2000 cycles.

SUMMARY OF THE INVENTION

The present invention provides an improved regulator valve assembly for a gas flow pressure regulator, which overcomes the deficiencies of conventional pressure regulators. In particular, the present invention provides for an improved regulator valve assembly that reduces the risk of misalignments of the regulator valve and/or valve force, thereby reducing valve friction and valve seat wear.

To overcome such deficiencies of conventional pressure regulator valves, an aspect of the invention is a regulator valve assembly for regulating pressure of a gas flowing through a gas flow pressure regulator. In an exemplary embodiment, a regulator valve assembly includes a valve seat and a valve moveable between an open and a closed position relative to the valve seat. The valve may include a valve disc having a flexible portion moveable upward and downward in an axial direction to open and close the valve, and an edge portion configured to self-align the valve disc within the valve seat and axially constrain the motion of the flexible portion. The flexible portion of the valve disc has a lateral spring force modulus and an axial spring force modulus, wherein the lateral spring force modulus is greater than the axial spring force modulus so as to laterally align the valve disc and axially constrain the motion of the flexible portion.

In another exemplary embodiment of a regulator valve assembly, the valve further may include a valve stem extending perpendicularly from a sealing portion of the valve disc, wherein the upward and downward movement of the valve stem results in an axial deflection of the flexible portion. The sealing portion may be formed at least in part of a resilient material, and the flexible portion and edge portion of the valve disc may be formed of a metallic corrosion-resistant material. Alternatively, the valve may be is a unitary piece forming the valve disc and the valve stem. The valve disc also may define at least one space to permit a gas flow through the valve disc.

In another exemplary embodiment of a regulator valve assembly, the valve disc includes a plurality of spiral arms that form the flexible portion and edge portions of the valve disc. The spiral arms are compressible radially inward to self-align the valve disc within the valve seat. The plurality of spiral arms may form an outer portion of the valve disc and spiral outward from the sealing portion for receiving a valve stem, and an edge portion of the spiral arms may be fixed to the valve seat to axially constrain the upward and downward movement of the flexible portion. The upward and downward movement of the valve stem results in an axial deflection of the flexible portion.

In another exemplary embodiment of a regulator valve assembly, the edge portions of the spiral arms may be fixed in the valve seat displaced from each other in the axial direction so as to bias the sealing portion in the axial upward direction for sealing the valve. The end portions of each of the spiral arms may be formed of an end protrusion for cooperating with a receiving portion of the valve seat. The valve seat may include a spring cup for receiving the end portion of the valve disc, and a curved support that at least partially wraps around the spring cup for holding the spring cup and the valve disc. A sealing gasket may seal a space between the spring cup and the curved support. The valve seat further may include a shelf, and the valve disc is positioned between the shelf and the spring cup for securing the valve disc within the valve seat. The spring cup may form a collar for loading the valve disc to bias the valve disc in the upward axial direction. The regulator valve assembly also may include a screen secured to the valve seat, wherein the screen and the valve disc define an intra-valve space between the screen and the valve disc for the flow of gas.

Another aspect of the invention is a gas flow pressure regulator for regulating pressure of a flowing gas from an inlet, through a regulator valve assembly, and to an outlet. An exemplary embodiment of a pressure regulator may include a range spring, a regulator valve assembly as described above, and a diaphragm between the range spring and the regulator valve assembly. A first pressure of gas flow from the inlet to the regulator valve assembly is converted by the regulator valve assembly to a second constant pressure gas flow from the regulator valve assembly to the outlet.

In another exemplary embodiment of a gas flow pressure regulator, a valve disc of the regulator valve assembly biases a valve stem against the diaphragm, and a force applied to the range spring displaces the valve stem in an axial direction to permit the flow gas through the regulator valve assembly. The valve disc centrally aligns and axially constrains the motion of the valve stem.

Another aspect of the invention is a method of regulating the pressure of gas flowing through a pressure regulator assembly. An embodiment of the method may include providing a valve seat and providing a valve moveable between an open and a closed position relative to the valve seat. The valve may include a valve disc having a flexible portion moveable upward and downward in an axial direction to open and close the valve, and an edge portion. The method further may include positioning the valve in the valve seat, wherein the edge portion self-aligns the valve disc within the valve seat and axially constrains the motion of the flexible portion.

Another embodiment of the method may further include providing a plurality of spiral arms to form the flexible portion and the edge portion of the valve disc. The positioning of the valve further may include displacing the spiral arms in the axial direction to bias the valve against the valve seat for sealing the valve.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 2 is a schematic diagram of a portion of the conventional regulator of FIG. 1, and depicts the force relationships of a conventional gas flow pressure regulator.

FIGS. 9A and 9B are schematic diagrams depicting an exemplary pressure regulator including the regulator valve assembly of FIG. 8 in accordance with embodiments of the present invention.

DETAILED DESCRIPTION

Figure 1:
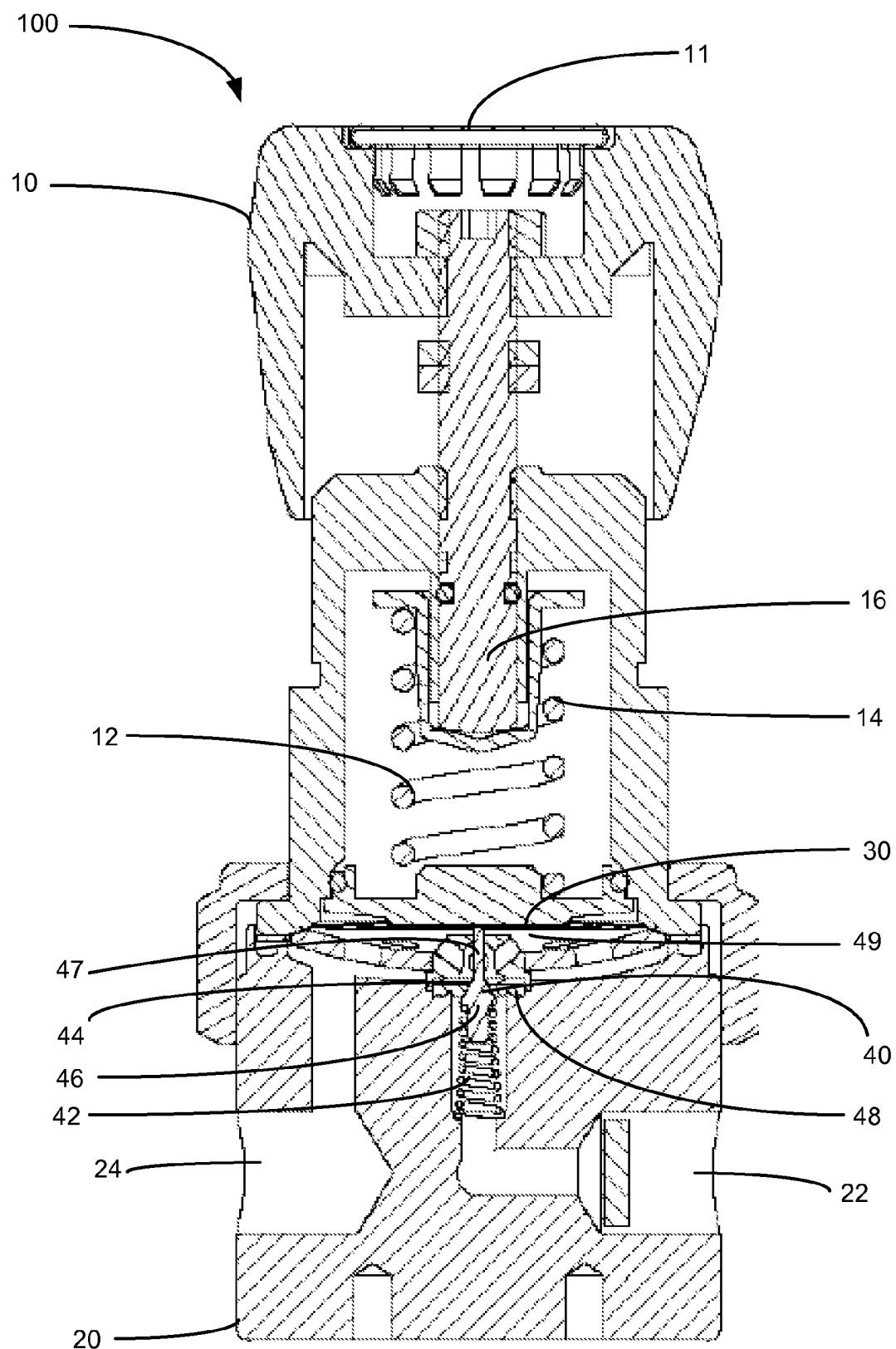
FIG. 1 is a schematic diagram depicting a conventional gas flow pressure regulator.
Figure 3:
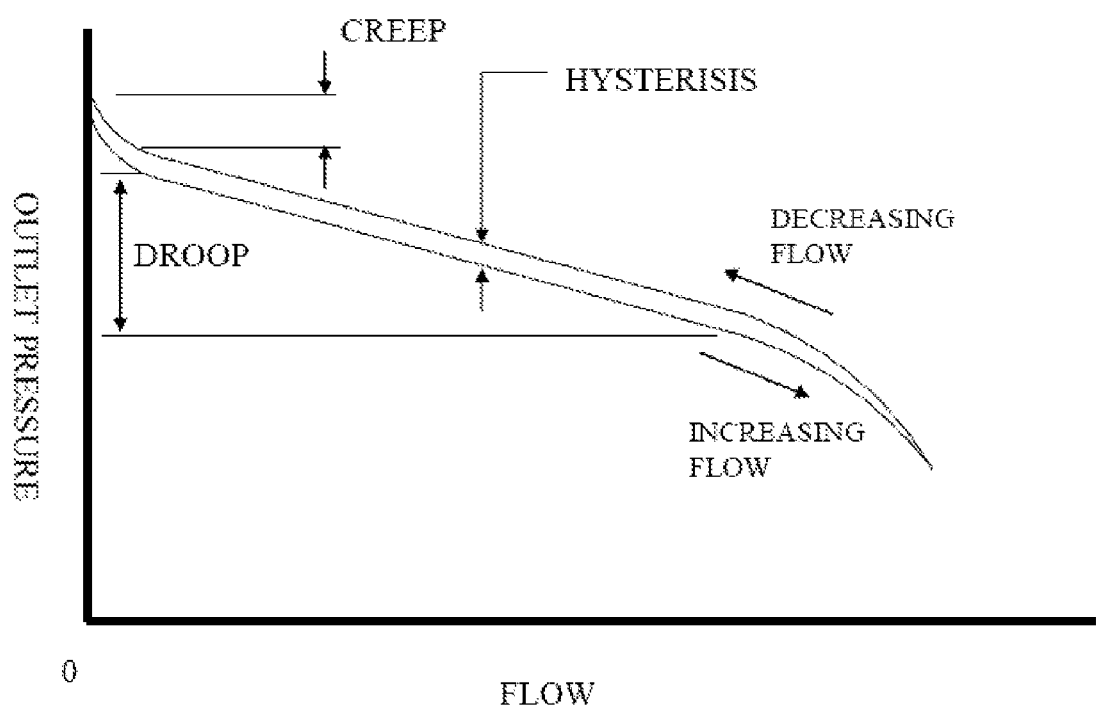
FIG. 3 is a graph depicting a graphical relationship of outlet pressure as function of flow for a conventional gas flow pressure regulator.
Figure 4:
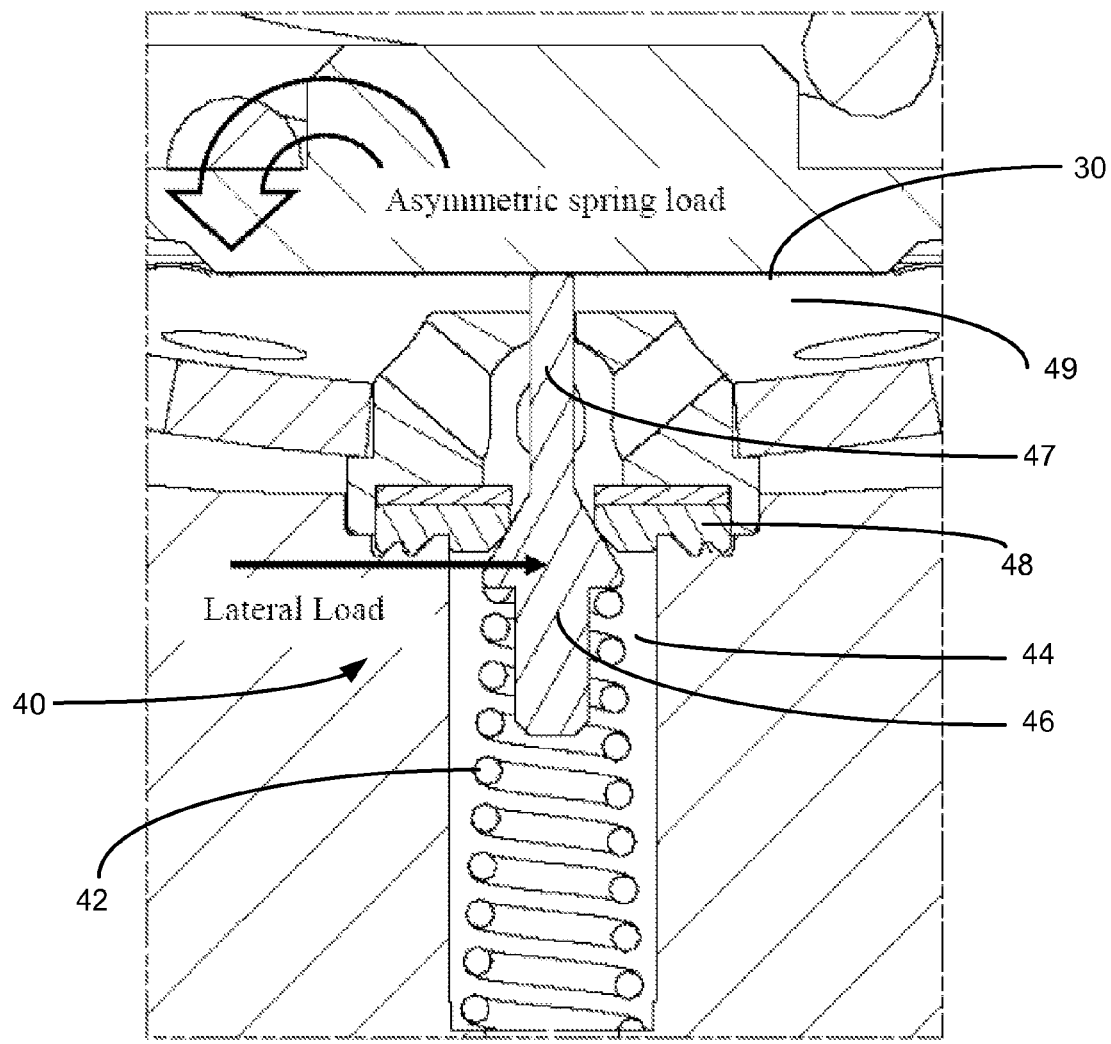
FIG. 4 is a schematic diagram of a portion of the conventional regulator of FIG. 1, and depicts asymmetric loading as may occur in a conventional valve configuration for a conventional gas flow pressure regulator.
Figure 5:
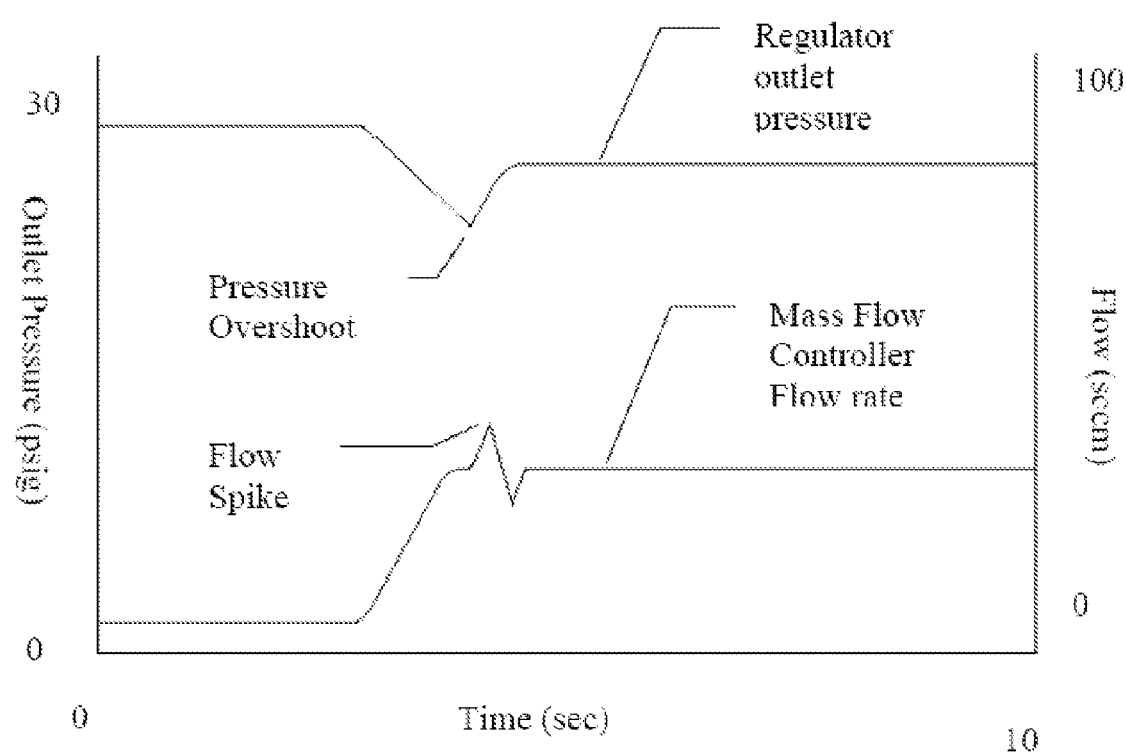
FIG. 5 is a graphical depiction of pressure overshoot and flow spike as may occur in a conventional gas flow pressure regulator.

Embodiments of the present invention will now be described with reference to the drawings, wherein like reference numerals are used to refer to like elements throughout. It will be understood that the figures are not necessarily to scale.

Figure 6:
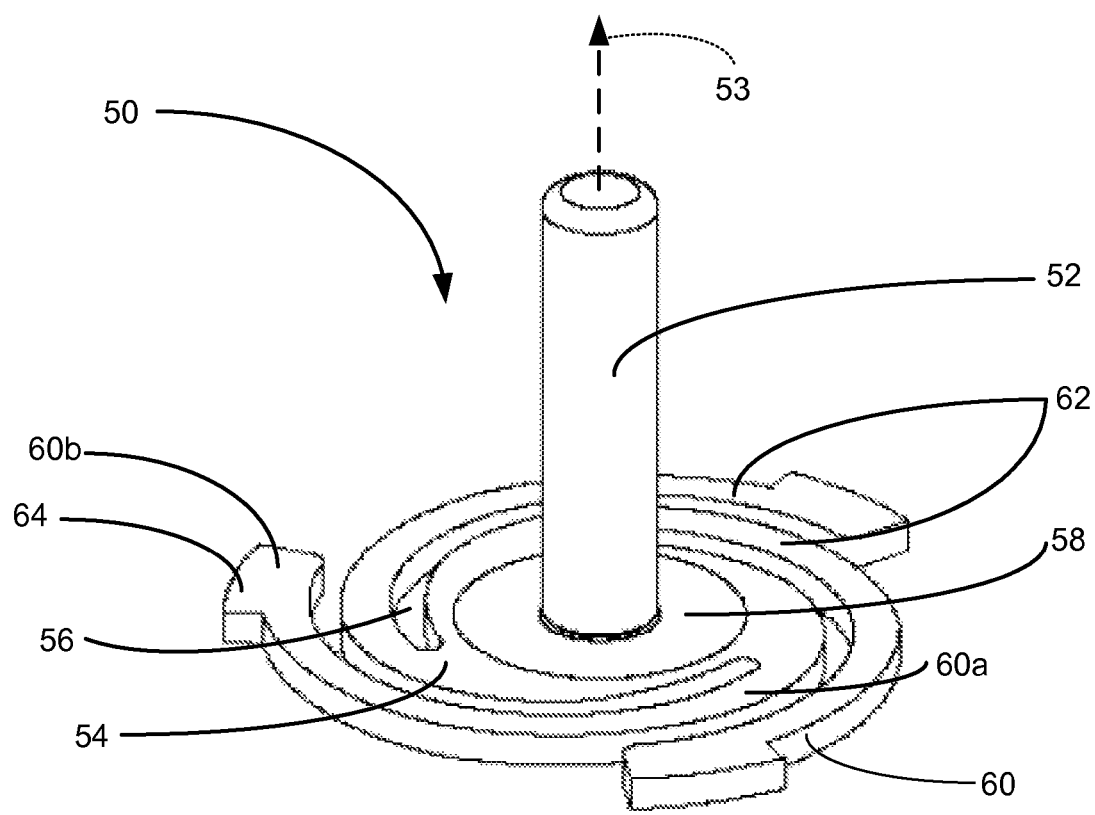
FIG. 6 is a schematic perspective diagram of an exemplary valve having a valve poppet and valve stem for use in a gas flow pressure regulator valve assembly in accordance with embodiments of the present invention.

FIG. 6 depicts an exemplary valve 50 for use in a gas flow pressure regulator valve assembly in accordance with embodiments of the present invention. The valve 50 may include a valve stem 52 and a valve poppet 54 in physical communication with the valve stem 52. As further explained below, the valve poppet 54 is provided in the form of a valve disc 54 that has a flexible portion that is flexible in an axial direction, i.e., the direction of a longitudinal axis of the valve stem so as to permit upward and downward movement of the valve stem relative to the valve disc. The valve disc also has a portion that is compressible in the radial direction toward the center of the valve disc so as to permit positioning the valve within with a valve assembly. The motion of the valve is axially constrained such that the valve stem can move essentially only axially upward and downward along a longitudinal axis of the valve stem.

Valve poppet/valve disc 54 may include an outer portion 60 that is secured within the greater valve assembly, and an inner sealing portion 58 to which the valve stem 52 may be attached. The outer portion 60 surrounds the sealing portion 58. The outer portion 60 is secured within the valve assembly in a manner that provides a preloading force to self-align the valve disc, which in turn axially constrains the movement of the valve stem. In the particular embodiment of FIG. 6, the outer portion or seat carrier 60 includes a plurality of spiral arms 62. In the exemplary embodiment depicted in FIG. 6, the outer portion 60 contains three such spiral arms, although it will be appreciated a different number of arms may be employed.

The spiral arms provide the valve disc with a flexible portion 60a and an edge portion 60b. The spiral configuration results in the following (though not limiting) exemplary characteristics. First, the spiral configuration provides a flexibility to the portion 60a of the valve disc in a direction perpendicularly to the plane of the valve disc as shown, i.e., in an axial direction along a longitudinal axis 53 of the valve stem 52. In other words, the upward and downward movement is provided by the spiral arms displacing relative to each other in an axial direction. Second, the spiral configuration provides a compressibility to the outer portion 60 of the valve disc in a direction radially toward the center of the valve disc. As further explained below, when the valve poppet/valve disc 54 is placed within the valve assembly, the spiral arms may be axially displaced. This results in a preloading force that self-aligns the valve poppet in the valve assembly, thereby centrally constraining the sealing portion 58 of the valve disc and the attached valve stem 52. As a result of such self-alignment, movement of the flexible portion 60a of the valve disc is axially constrained (i.e., along the longitudinal axis of the valve stem). Each spiral arm may end in an end portion 64. The end portion 64 may be a protrusion that provides for securing the valve disc within the greater valve assembly.

It will be appreciated that configurations other than spiral arms may be utilized in the valve disc/valve poppet 54. As with spiral arms, such other configurations should have a flexible portion that can move upward and downward relative to a plane of the valve disc at rest. Such other configurations also should provide for self-aligning the valve disc within the valve assembly, such that the motion of the flexible portion is axially constrained. For example, alternative configurations of the outer portion of the valve disc may be concentric rings connected by flexible spokes, a flexible screen with a rigid perimeter to secure to the valve seat, circumferential spring members connected to an inner disc portion, and the like.

In typical applications, it is desirable that the valve disc be corrosion resistant. To provide the desired axial flexibility and corrosion resistance of the spiral arms, the valve disc 54 may be made from a thin corrosion-resistant metal material. For example, the valve disc may be formed of 0.020 inch thick full hard 316L stainless steel or Hastelloy C276. The valve disc arms may be formed having a rectangular cross-section, the 0.02 inch thickness being small as compared to the radial length of the valve disc, typically about 0.204 in from the center to an outer edge of the valve disc. The sealing portion 58 may be embedded in the inner portion of the valve disc. The sealing portion may be continuous with the outer portion of the valve disc, with the sealing portion at least in part being made of a resilient sealing material. For example, the sealing portion may include a layer of any one of a class of resilient synthetic rubber-like compounds, such as fluoroelastomers and other fluoro-polymers, including perfluoro elastomers (FFKM) and like compounds. In practice, it is desirable to minimize the amount of the flexible material to a size that just permits the sealing material to seal the valve when the valve is in the closed position.

In the particular embodiment of FIG. 6, the sealing portion 58 is circular and centrally located within the valve disc to connect the valve stem to the valve disc, although other shapes and configurations of the sealing portion 58 may be employed. The valve poppet/valve disc 54 and valve stem 52 together may form the valve 50. In one embodiment, the valve disc and the valve stem may be molded as a unitary piece from a common material, with a layer of sealing material added subsequently.

In operation of the valve 50, axial downward movement by driving the valve stem 52 to open the valve causes respective axial downward movement of the flexible portion 60*a* to permit the flow of gas. To close the valve, the driving force may be removed from the valve stem, and the valve stem is biased upward by the valve disc to seal the valve. The spiral arms have high lateral spring rates, which ensures the spiral arms can readily displace relative to each other along the longitudinal axis 53 of the valve 50 without significant lateral displacement. In this manner, the movement of the valve stem 52 is axially constrained and occurs in a substantially frictionless manner. Relatedly, since sealing portion 58 and valve stem 52 are centrally aligned by the spiral arms 62, there is no friction generated by the valve against a valve seat as in the conventional regulator valve assembly.

In another exemplary embodiment, the valve disc 54 may define spaces 56 that permit a gas flow through the poppet (and thus through the regulator valve).

Figure 7A:
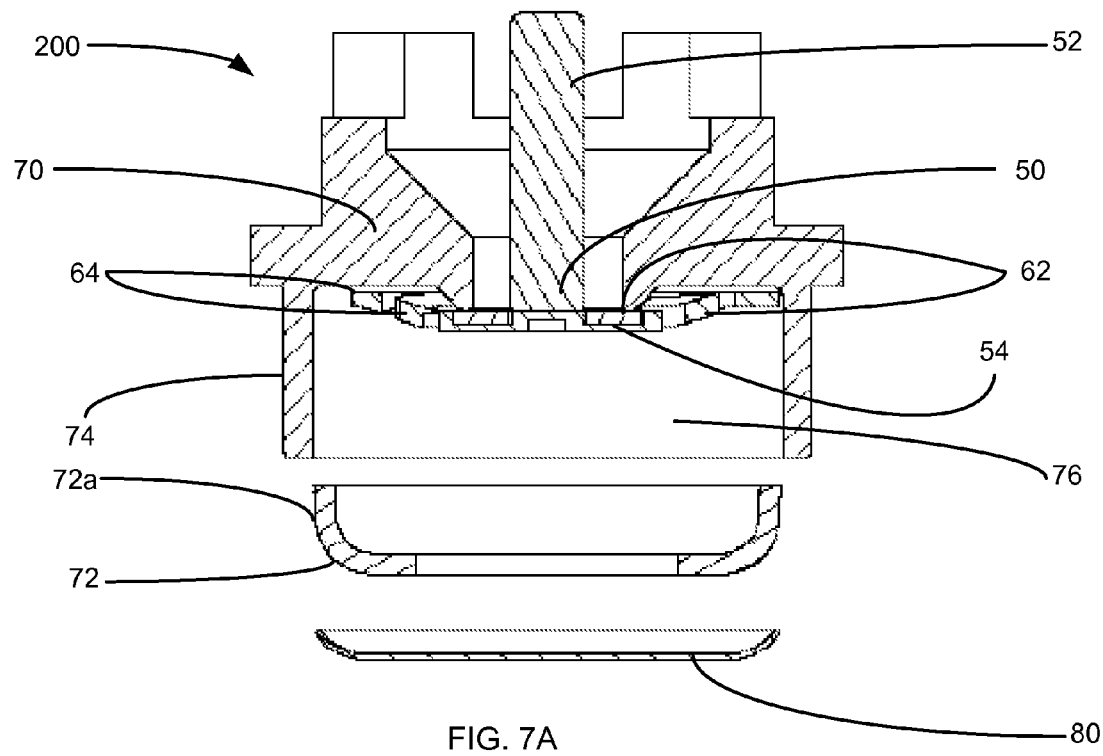
FIGS. 7A and 7B are schematic diagrams depicting an exemplary regulator valve assembly including the valve of FIG. 6 for use in a pressure regulator in accordance with embodiments of the present invention.
Figure 7B:
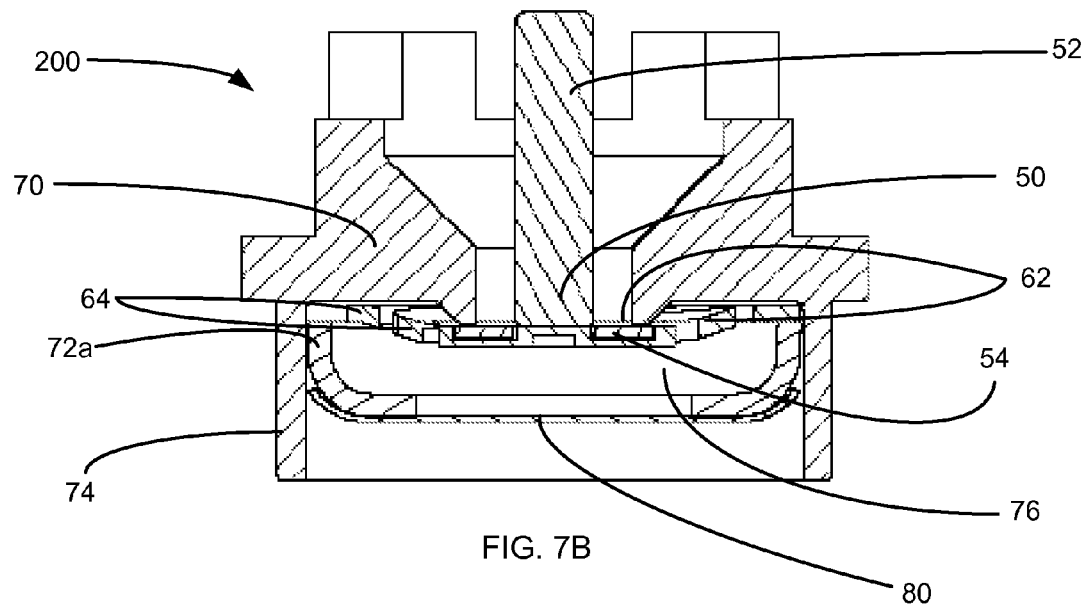

FIG. 7A depicts an exemplary regulator valve assembly 200 in a partially exploded form, including the valve 50 of FIG. 6, for use in a pressure regulator in accordance with embodiments of the present invention. FIG. 7B depicts the placement of the components of FIG. 7A. In particular, FIGS. 7A and 7B depict a regulator valve assembly 200 having the valve 50 as described above, and a valve seat 70 against which the valve seals and opens to respectively restrict and permit the flow of gas. Portions of the valve 50 are identified with the same reference numerals as in FIG. 6.

As seen in FIGS. 7A and 7B, the spiral arms 62 are positioned in the valve assembly displaced in the axial direction of the valve assembly relative to each other. This displaced positioning provides an upward bias to the valve to generate a closing force to affect a seal of the sealing portion 58 of the valve disc against the valve seat 70. The edge portion 60*b* of the valve disc 54, formed of an end portion of each of the spiral arms 62, is fixed to the valve seat 70. As further explained below, travel of the poppet is driven by a force of the range spring against the diaphragm, and in turn against the valve stem 52. The multiple radial arms axially constrain the motion to permit the valve stem to move only in an axial direction, the axial direction being defined as the longitudinal axis through the valve stem.

The radial spiral arms act as cantilever beams that may be deflected radially inward with a relatively high spring force modulus as compared to a relatively low spring force modulus of the spiral arms in the axial direction. An inward deflection is performed one time at assembly to fix the valve disc within the valve seat. The edge portion 60*b* of the valve disc is thus fixed such that there is no further movement of the edge portion. At the more radially inward flexible portion 60*a* of the spiral arms, the three spiral arms acting as cantilever beams can still deflect along the axis 53 (see FIG. 6) of the poppet and valve stem axis during operation. As indicated, the three spiral arms have a relatively high lateral spring force modulus (as compared to the axial spring force modulus), which prevents the sealing portion 58 from moving laterally thereby constraining the motion to the axial direction.

As further depicted in FIGS. 7A and 7B, the end portions 64 (see also FIG. 6) of the spiral arms may cooperate with a receiving portion of the valve seat. For example, the end protrusions 64 of the spiral arms 62 may be in contact with a spring cup 72 acting as the receiving portion. The spring cup 72 forms a collar to maintain a load against the arm protrusions 64 to self-align the valve disc. The collar presents a thin annular shoulder 72*a* to firmly hold the protrusions 64 of the arms in place while avoiding the adjacent moving of elements of the radial arms 62. In the present embodiment, the collar shoulder secures the perimeter of the valve disc with no rubbing on the moveable element of the valve disc, which would otherwise generate friction and eroded particles. The arm protrusions 64 thus are fixed to the spring cup such that as the valve stem 52 moves upward and downward along its longitudinal axis, the valve disc does not displace from the spring cup or collar 72. The spring cup and collar 72 may be held in position by a support member 74. In addition, a screen 80 may be secured against the spring cup such that the screen 80 and valve disc 54 define an intra-valve space 76 for the gas flow. The screen 80 thus permits a gas flow from a source (not shown) to the poppet/valve disc 54.

Figure 8:
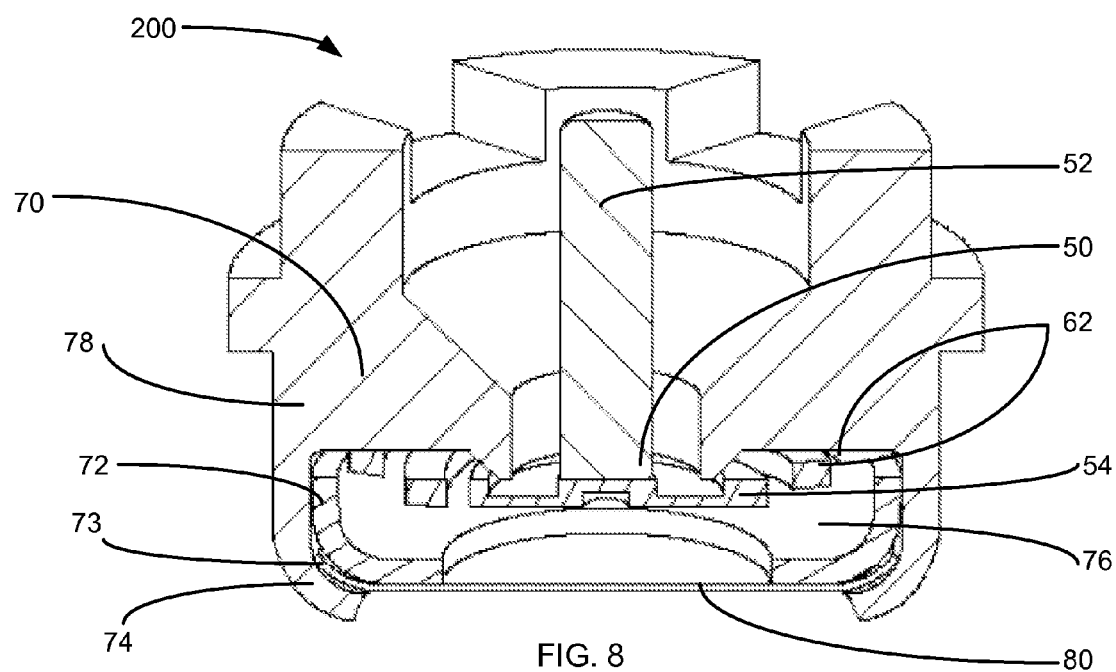
FIG. 8 is a schematic perspective diagram of a fully assembled valve assembly in accordance with embodiments of the present invention.

FIG. 8 depicts the fully assembled valve assembly 200. In FIG. 8, the support member 74 has been crimped into a curved support that at least partially wraps around the spring cup 72 to secure the spring cup. A sealing gasket 73 also may be provided between the spring cup and the curved support. The curved support 74 extends continuously from a shelf 78, also known as a load bearing lip 78. The shelf provides a surface against which the valve is biased when the valve is sealed. The screen 80 may be secured between the spring cup and curved support in the vicinity of the sealing gasket 73.

As stated above, when the valve poppet/valve disc 54 is positioned within the valve seat 70, the spiral arms may be axially displaced relative to each other to provide a preloading force to seal the valve. The displacement provides a biasing force to self-align the valve disc and axially constrain the motion of the flexible portion of the valve poppet and thus the valve stem. As a consequence, the valve stem in turn is properly aligned and axially constrained, thereby substantially obviating the potential for misalignment of the valve. In this manner, deficiencies of conventional regulator valves are avoided. In particular, a misalignment of the valve poppet does not occur because the preloading force of the spiral arms prevents any lateral displacement of the valve poppet within the valve seat. Furthermore, there is no frictional force to overcome between the valve and valve seat to displace the valve. In this manner, valve seat wear also is avoided. Applicants have found a regulator valve having the configuration of the present invention can run two million cycles or more without experiencing a noticeable change of performance.

FIGS. 9A and 9B depict an exemplary pressure regulator 300 including the regulator valve assembly of FIGS. 7A-B and 8 in accordance with embodiments of the present invention. In particular, FIG. 9B is a close-up view of the regulator of FIG. 9A in the area denoted by the circular portion "D".

Comparing FIG. 9A to the conventional pressure regulator of FIG. 1, as described above the conventional regulator valve assembly includes a valve spring 42 and a poppet having 46 in communication with the valve spring at one end, and the valve stem 47 at an opposite end. As seen in FIGS. 9A and 9B, the regulator valve assembly 200 of the present invention does not include the valve spring 42 and valve poppet configured like conventional valve poppet 46. Rather, in FIGS. 9A and 9B such structures have been substituted with the valve 50 including the valve disc 54 and its associated structures. In addition, the valve shelf 78 of the present invention presses against compression members 82, which help restrain the valve assembly 200 from movement apart from the movement of the valve 50.

In the embodiment of FIGS. 9A and 9B, therefore, the flexible portion of the valve disc within the spiral arms permits upward and downward movement of the valve stem 52, instead of employing a valve spring as in the conventional configuration. In addition, the spiral arms self-align and axially constrain the valve poppet 54 in the valve seat 70, and no comparable structures self-align and axially constrain the regulator valve assembly 40 in the conventional pressure regulator of FIG. 1. In this manner, by self-aligning and axially constraining the valve poppet, the valve assembly 200 of regulator 300 of FIGS. 9A and 9B is not subject to misalignment and the associated deficiencies in performance as is the conventional valve 40 of FIG. 1.

Apart from the regulator valve assembly 200 of the present invention, the regulator 300 of FIGS. 9A and 9B may include certain similar features to the conventional regulator 100 of FIG. 1. For example, the regulator 300 may include a range spring 12 and associated support and housing structures. Regulator 300 further may include a diaphragm 30 between the range spring 12 and the valve assembly 200. The valve assembly 200 may be incorporated into a lower assembly having an inlet 22 and outlet 24 for the gas flow through the valve assembly 200. Regulator 300 operates as follows to control the pressure of a flowing gas from the inlet 22, through the valve assembly 200, and to the outlet 24. In the valve assembly 200, the valve is loaded against the valve seat 70 by the biasing of the spiral arms to stop the flow of gas. Axial motion of the poppet is driven by a force of the range spring against the diaphragm, which force in turn is transmitted against the valve stem 52. The multiple radial arms axially constrain the motion to permit the poppet to move only in an axial manner to open the valve.

The upper end 14 of the range spring 12 is compressed by means of a threaded stem 16 to create a downward load similarly to a conventional regulator to provide the opening force of the valve. As stated above, this drives the diaphragm 30 down to drive the valve 50 away from the valve seat 70, which allows gas to flow into the chamber below the diaphragm 30. The diaphragm acts to prevent gas from escaping to the atmosphere, while being flexible enough to transmit the load from the range spring 12 to the valve assembly 200. When the outlet pressure acting on the diaphragm generates a force equal to the range spring force, the system is balanced and the device will maintain a constant pressure of gas flow from the valve assembly 200 to the regulator outlet 24.

The force relations of the regulator 300 of the present invention thus are similar to those of FIG. 2 for the conventional regulator. As to valve assembly 200, however, in contrast to the conventional regulator, the configuration of the outer portion 60 (e.g., spiral arms 62) of the valve disc 54 self-aligns and axially constrains the valve 50 within the valve seat 70 to prevent misalignment of the valve 50 and the associated forces. Furthermore, the flexible portion of the valve disc spiral arms permits the axial upward and downward movement of the valve stem 52 during operation without having to overcome any frictional force against the valve seat. In this manner, gas flow pressure through the regulator is properly regulated without the deficiencies of the conventional regulator configuration described above.

Figure 10:
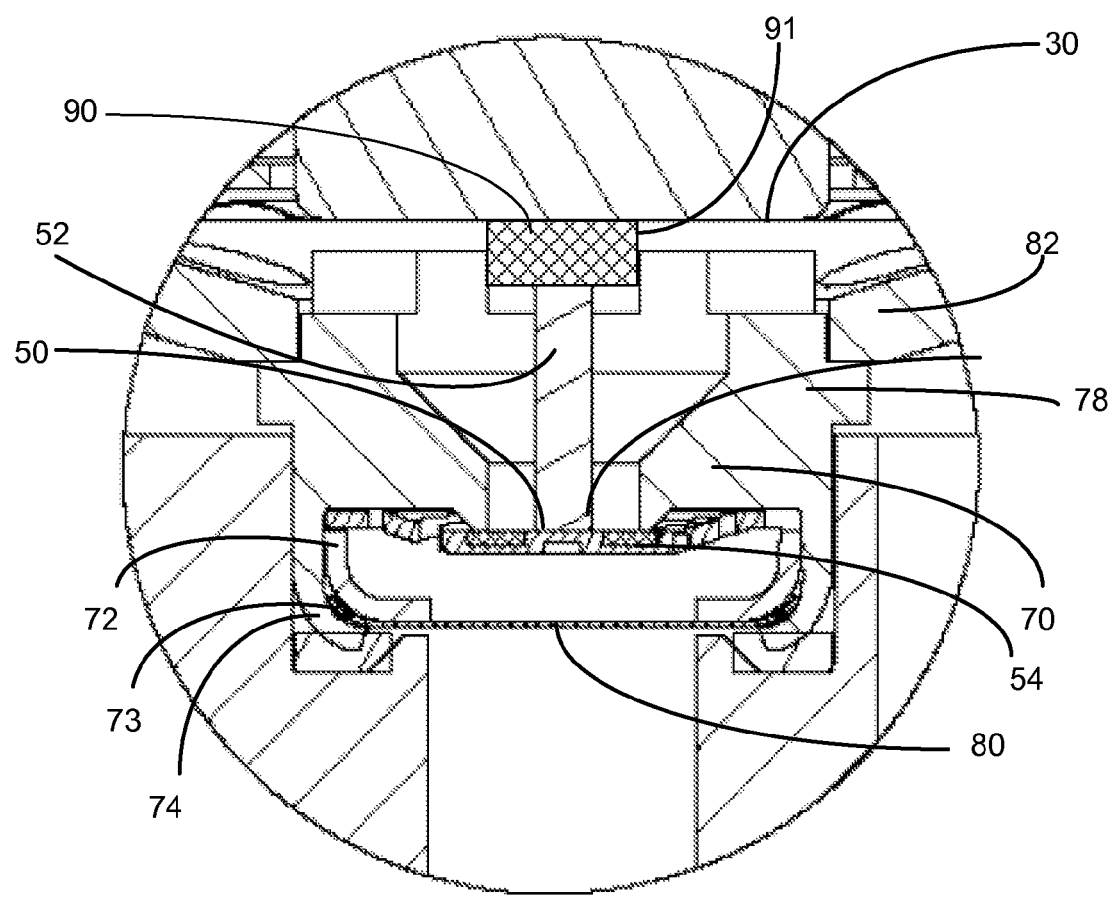
FIG. 10 is a schematic diagram depicting a portion of an exemplary pressure regulator in which a threaded portion of a valve stem cooperates with a threaded receptor provided on a diaphragm to secure the valve stem to the diaphragm.

An alternative embodiment is depicted in FIG. 10. FIG. 10 depicts a valve assembly 200 for a pressure regulator comparable in most respects to that of FIG. 9B. In the embodiment of FIG. 10, a threaded portion 90 includes mating threads on an end of the valve stem 52 that cooperate with opposite mating threads on a receptor 91 provided on a diaphragm 30. In this manner, the valve stem may be secured to the diaphragm so that the two structures move as a single piece.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A regulator valve assembly for regulating pressure of gas flowing through a gas flow pressure regulator, the regulator valve assembly comprising:
   a valve seat; and
   a valve moveable between an open and a closed position relative to the valve seat;
   wherein the valve comprises a valve disc having a sealing portion constituting a sealing surface of the valve disc, which contacts the valve seat when the valve is in the closed position;
   wherein the valve disc includes a plurality of spiral arms extending outwardly from the sealing portion in a continuous and gradually widening curve around an axial direction, the plurality of spiral arms having end portions that are movable relative to each other when the valve disc is in an uninstalled state;
   wherein the plurality of spiral arms form a flexible portion which is moveable upward and downward in the axial direction to open and close the valve, the plurality of spiral arms being displaceable relative to each other and configured to self-align the valve disc within the valve seat and to axially constrain the motion of the valve disc to motion along the axial direction; and
   wherein the plurality of spiral arms form an edge portion which provides for securing the valve disc in an installed state, the edge portion including the end portion on each of the spiral arms, wherein the end portions are fixed to the valve seat to axially constrain the upward and downward movement of the flexible portion, the end portions being displaced from the sealing portion in the axial direction, and being displaced in the axial direction relative to each other, so as to bias the sealing portion in the axial upward direction for sealing the valve.

2. The regulator valve assembly according to claim 1, wherein the flexible portion of the valve disc has a lateral spring force modulus and an axial spring force modulus, wherein the lateral spring force modulus is greater than the axial spring force modulus so as to laterally align the valve disc and axially constrain the motion of the flexible portion.

3. The regulator valve assembly according to claim 1, wherein the valve further comprises a valve stem extending perpendicularly from a sealing portion of the valve disc, wherein upward and downward movement of the valve stem results in respective upward and downward movement of the flexible portion.

4. The regulator valve assembly according to claim 3, wherein the sealing portion is formed at least partly of a resilient material and the edge portion and flexible portion are formed of a metallic corrosion-resistant material.

5. The regulator valve assembly according to claim 1, wherein the valve disc defines at least one space to permit a gas flow through the valve disc.

6. The regulator valve assembly according to claim 1, wherein the spiral arms each has a rectangular cross section of dimensions less than a radius of the valve disc.

7. The regulator valve assembly according to claim 1, wherein the edge portion of the valve disc cooperates with a receiving portion of the valve seat.

8. The regular valve assembly according to claim 1, wherein the valve seat comprises a spring cup for receiving the edge portion of the valve disc.

9. The regulator valve assembly according to claim 8, wherein the valve seat further comprises a curved support that at least partially wraps around the spring cup for holding the spring cup and the valve disc.

10. The regular valve assembly according to claim 9, further comprising a sealing gasket for sealing a space between the spring cup and the curved support.

11. The regulator valve according to claim 8, wherein the valve seat further comprises a shelf, and the valve disc is positioned between the shelf and the spring cup for securing the valve disc within the valve seat.

12. The regulator valve assembly according to claim 8, wherein the spring cup comprises a collar for loading the valve disc to bias the valve disc in the upward axial direction.

13. The regulator valve assembly according to claim 1, further comprising a screen secured to the valve seat, wherein the screen and the valve disc define an intra-valve space between the screen and the valve disc for the flow of gas.

14. The regulator valve assembly according to claim 1, wherein the sealing portion is formed at least in part of a resilient material and the edge portion and flexible portion are formed of a metallic corrosion-resistant material.

15. A gas flow pressure regulator for regulating pressure of a flowing from an inlet, through a regulator valve assembly, and to an outlet, the pressure regulator comprising:
a range spring;
a regulator valve assembly according to claim 1; and
a diaphragm between the range spring and the regulator valve assembly;
wherein a first pressure of gas flow from the inlet to the regulator valve assembly is converted by the regulator valve assembly to a second constant pressure gas flow from the regulator valve assembly to the outlet.

16. A gas flow pressure regulator according to claim 15, wherein a valve disc of the regulator valve assembly biases a valve stem against the diaphragm, and a force applied to the range spring displaces the valve stem in an axial direction to permit the flow gas through the regulator valve assembly, and
wherein the valve disc is configured to centrally align and axially constrain the motion of the valve stem.

* * * * *